(12) United States Patent
Kido et al.

(10) Patent No.: US 6,508,326 B2
(45) Date of Patent: Jan. 21, 2003

(54) SWING ARM FOR VEHICLE (75) Inventors: Hiroyuki Kido, Saitama (JP); Takashi Doi, Saitama (JP); Hiroshi Ishihara, Saitama (JP); Takanori Ishii, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 9 days.

(21) Appl. No.: 09/891,410

(22) Filed: Jun. 27, 2001

(65) Prior Publication Data

US 2002/0011370 A1 Jan. 31, 2002

(30) Foreign Application Priority Data

Jun. 27, 2000 (JP) ........................................ 2000-192132

(51) Int. Cl.$^7$ .............................................. B62M 17/00
(52) U.S. Cl. ...................................... 180/226; 180/253
(58) Field of Search .................................. 180/253, 226, 180/256, 227, 348, 124.156; 280/284

(56) References Cited

U.S. PATENT DOCUMENTS

| | | | | |
|---|---|---|---|---|
| 2,377,124 A | * | 5/1945 | Ballamy et al. | 180/33 |
| 4,076,271 A | * | 2/1978 | Doncque | 280/284 |
| 4,436,173 A | * | 3/1984 | Takahashi | 180/226 |
| 4,540,193 A | * | 9/1985 | Noda et al. | 280/284 |
| 4,664,215 A | * | 5/1987 | Suzuki et al. | 180/226 |
| 4,953,656 A | * | 9/1990 | Kondo et al. | 180/226 |
| 5,263,549 A | * | 11/1993 | Dick | 180/226 |
| 5,918,695 A | * | 7/1999 | Matsuura et al. | 180/226 |

* cited by examiner

Primary Examiner—Kevin Hurley
Assistant Examiner—Tony Winner
(74) Attorney, Agent, or Firm—Birch, Stewart, Kolasch & Birch, LLP (57) ABSTRACT

To provide a swing arm for a vehicle which can ensure the rigidity of a fastened portion of the swing arm to a final gear case with a simple configuration. A swing arm for a vehicle pivotably mounted on a body frame and having a swinging end fastened to a final gear case on which a rear wheel is mounted. A reinforcing plate is provided in the vicinity of the swinging end of the swing arm and fastened to the swing arm at two positions spaced apart from each other in the longitudinal direction of the vehicle.

20 Claims, 7 Drawing Sheets

SWING ARM FOR VEHICLE

BACKGROUND OF THE INVENTION

1. Field of the Invention

The present invention relates to a swing arm for a vehicle, and more particularly to a swing arm for use in a vehicle such as a motorcycle.

2. Description of Background Art

In a vehicle such as a motorcycle, a swing arm is vertically pivotably mounted on a body frame at a rear lower portion thereof, and a rear wheel is supported to a swinging end of the swing arm. The power of an engine mounted on the body frame is transmitted through a power transmitting mechanism to the rear wheel.

A known configuration of the power transmitting mechanism is such that a drive shaft is connected to the engine, that a final gear case on which the rear wheel is mounted is fastened to the swinging end of the swing arm, and that a final gear in the final gear case meshes with the drive shaft.

In such a swing arm for a vehicle adopting the power transmitting mechanism employing a drive shaft and a final gear, it is necessary to insert the drive shaft in the swing arm, so that the swing arm is a hollow member.

In fastening the hollow swing arm and the final gear case, it is necessary to form recesses for receiving fastening bolts at a fastened portion of the swing arm to the final gear case. However, the formation of the recesses causes a problem in that it is difficult to provide sufficient rigidity balance between the swing arm and other portions, and it is therefore desired to take measures against this problem.

SUMMARY AND OBJECTS OF THE INVENTION

It is accordingly an object of the present invention to provide a swing arm for a vehicle which can ensure the rigidity of a fastened portion of the swing arm to a final gear case with a simple configuration.

In accordance with the present invention, there is provided a swing arm for a vehicle pivotably mounted on a body frame and having a swinging end fastened to a final gear case on which a rear wheel is mounted, wherein a reinforcing plate is provided in the vicinity of the swinging end of the swing arm and fastened to the swing arm at two positions spaced apart from each other in the longitudinal direction of the vehicle.

In accordance with the present invention, the reinforcing plate described in claim 1 is formed of iron.

In accordance with the present invention, the reinforcing plate is fastened through an elastic member to the swing arm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the drawings.

Figure 1:
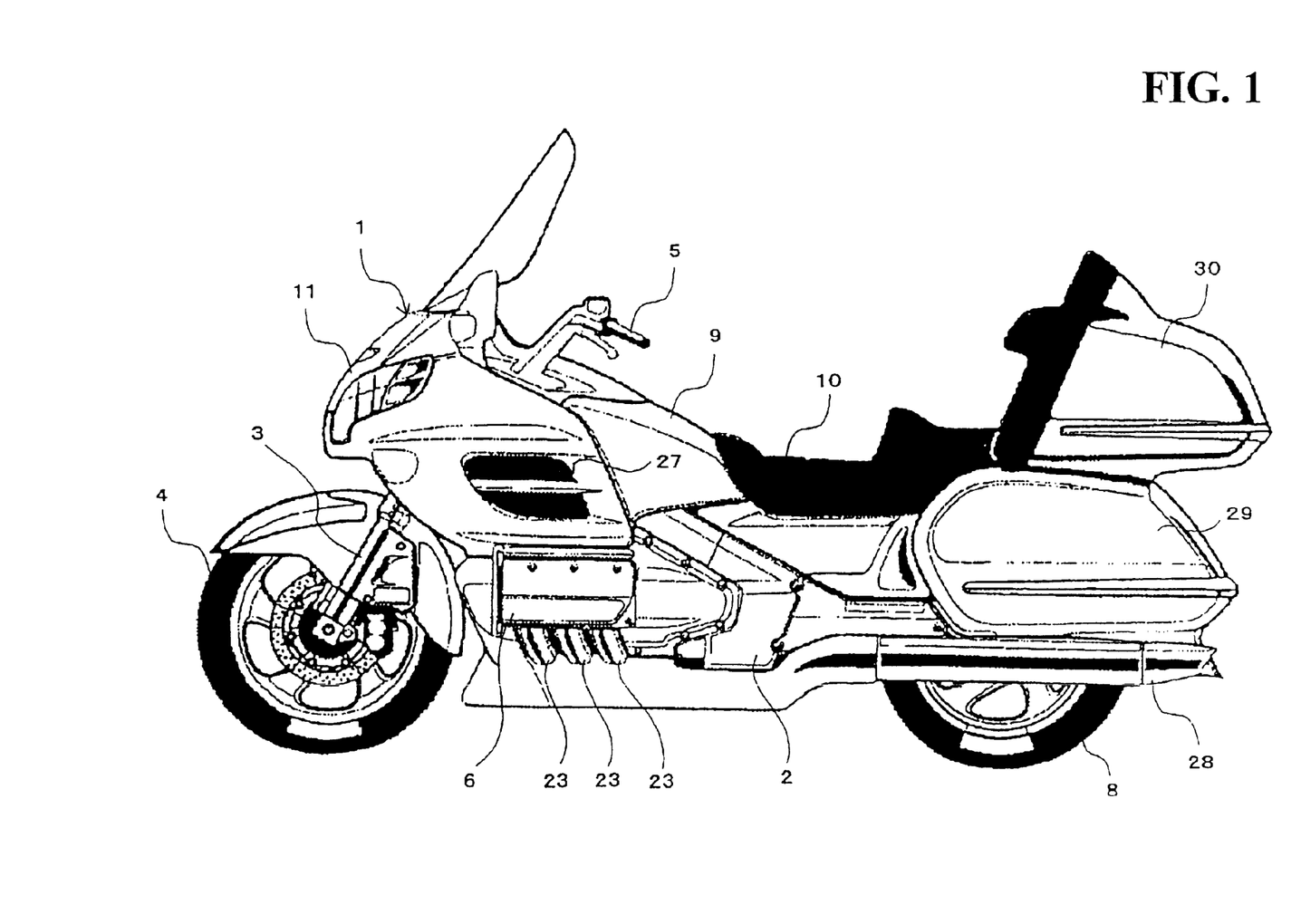
FIG. 1 is a side view of a motorcycle as a vehicle to which a preferred embodiment of the present invention is applied.

FIG. 1 shows a motorcycle 1 as a vehicle to which a preferred embodiment of the present invention is applied.

Figure 2:
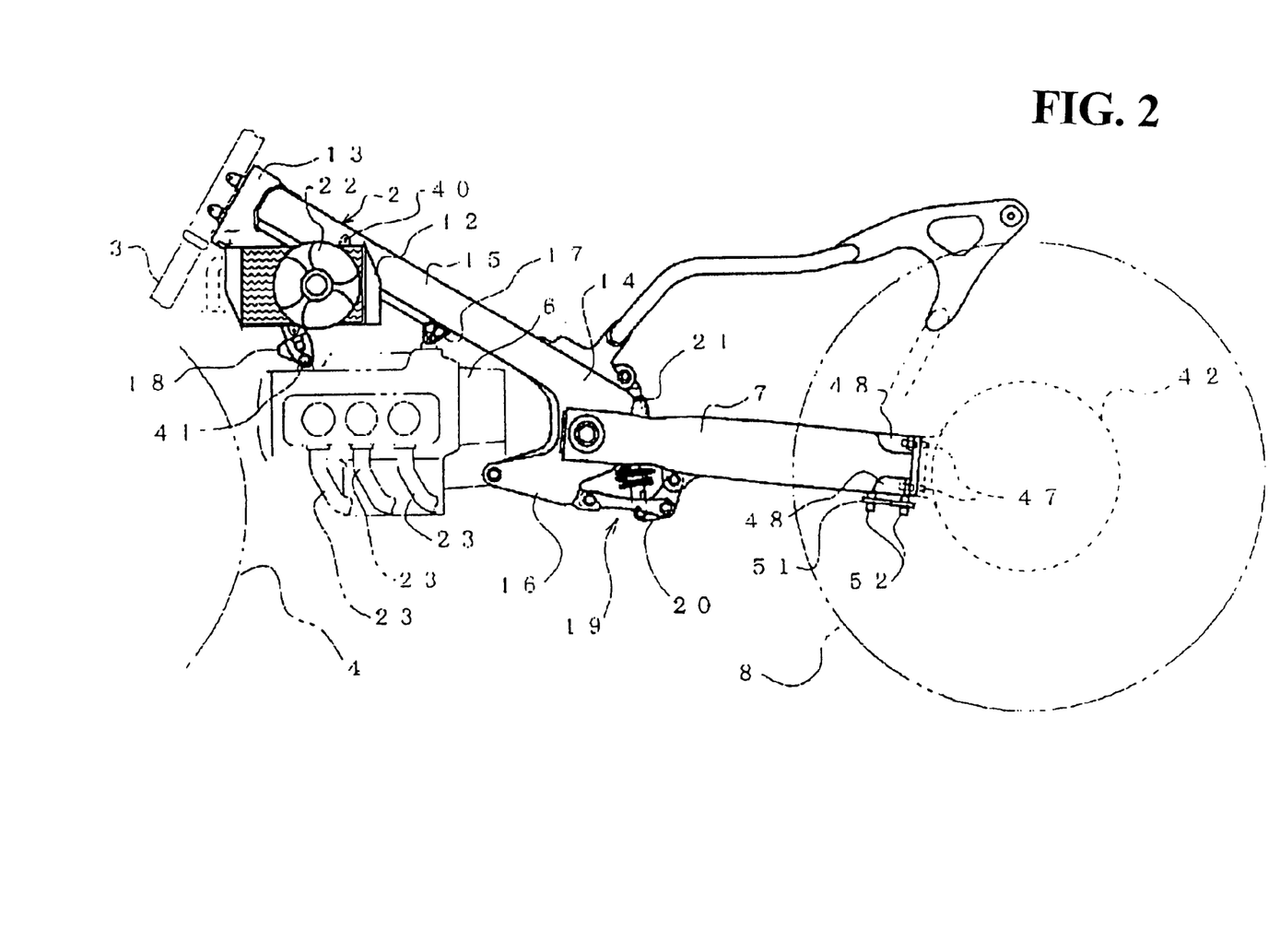
FIG. 2 is a side view of a body frame and its peripheral parts of the vehicle according to the preferred embodiment.

The motorcycle 1 is a saddle seat type vehicle that includes a body frame 2, a front fork 3 steerably mounted on the body frame 2 at a front end portion thereof, a front wheel 4 rotatably mounted on the front fork 3 at a pair of lower end portions thereof, a steering handle 5 fixedly mounted on the front fork 3 at an upper end portion thereof. A horizontally opposed engine 6 is suspended and supported below a front portion of the body frame 2 behind the front fork 3. A swing arm 7 (see FIG. 2) is vertically pivotably mounted on the body frame 2 at a rear end portion thereof so as to extend rearwardly therefrom. A rear wheel 8 is rotatably mounted on the swing arm 7 at a rear end portion thereof as a swinging end. A fuel tank 9 is mounted on the body frame 2 at a front upper portion thereof. A seat 10 is mounted on the body frame 2 at a portion behind the fuel tank 9, and a front cowl 11 is provided so as to cover a front upper portion of the front fork 3 and opposite side portions of the fuel tank 9 and the body frame 2. Further, as shown in FIG. 2, a pair of right and left radiators 12 (left one being shown) are mounted on the body frame 2 at opposite side portions thereof above the horizontally opposed engine 6 to cool the engine 6.

The configuration of the motorcycle 1 will now be described in more detail. As shown in FIG. 2, the body frame 2 is composed of a head pipe portion 13 for steerably mounting the front fork 3, a pair of right and left swing arm pivot portions 14 for pivotably mounting the swing arm 7, and a pair of right and left tank rail portions 15 for connecting the head pipe portion 13 and the swing arm pivot portions 14.

The swing arm pivot portions 14 are located at a position below the head pipe portion 13 and behind the engine 6. A pair of bracket portions 16 extend frontwardly from the lower ends of the swing arm pivot portions 14, and the engine 6 is connected to the bracket portions 16 of the swing arm pivot portions 14.

The tank rail portions 15 are vertically inclined so that their rear portions are lower in level than their front portions. A pair of brackets 17 are provided on the lower surfaces of the tank rail portions 15 at their longitudinally intermediate positions, and the engine 6 is connected to the brackets 17 of the tank rail portions 15.

A pair of brackets 18 extend downwardly from the lower end of the head pipe portion 13 toward an front upper portion of the engine 6 located below and behind the head pipe portion 13, and the engine 6 is connected to the brackets 18 of the head pipe portion 13.

A shock absorber 19 for controlling the swing motion of the swing arm 7 is provided between the swing arm 7 and the swing arm pivot portions 14.

The shock absorber 19 is composed of a link mechanism 20 provided between the lower ends of the swing arm pivot portions 14 and the lower surface of the swing arm 7 at its longitudinally intermediate position, and a rear shock 21 interposed between the link mechanism 20 and the upper ends of the swing arm pivot portions 14.

Each radiator 12 extends in the longitudinal direction of the vehicle body, and is mounted on the body frame 2 in such a manner that the upper end of each radiator 12 is fixed to the corresponding tank rail portion 15 by means of a bolt 40 and the lower end of each radiator 12 is fixed to the corresponding bracket 18 by means of a bolt 41.

Further, an electric fan 22 for forcibly introducing cooling air into each radiator 12 is mounted on each radiator 12. By operating each electric fan 22, the air entered the inside of the vehicle body from the front side thereof is forcibly introduced into each radiator 12 and passed therethrough. Thereafter, the air is discharged from the opposite sides of the vehicle body.

A plurality of exhaust pipes 23 are connected to a lower portion of the engine 6.

A pair of right and left air outlets 27 are provided at opposite side portions of the front cowl 11 so as to cover the right and left radiators 12, respectively. The air passed through the radiators 12 by the electric fans 22 is discharged through the air outlets 27 to the outside of the vehicle body.

In FIG. 1, a muffler 28 is connected to the exhaust pipes 23, and baggage boxes 29 and 30 are secured to the motorcycle frame.

Figure 3:
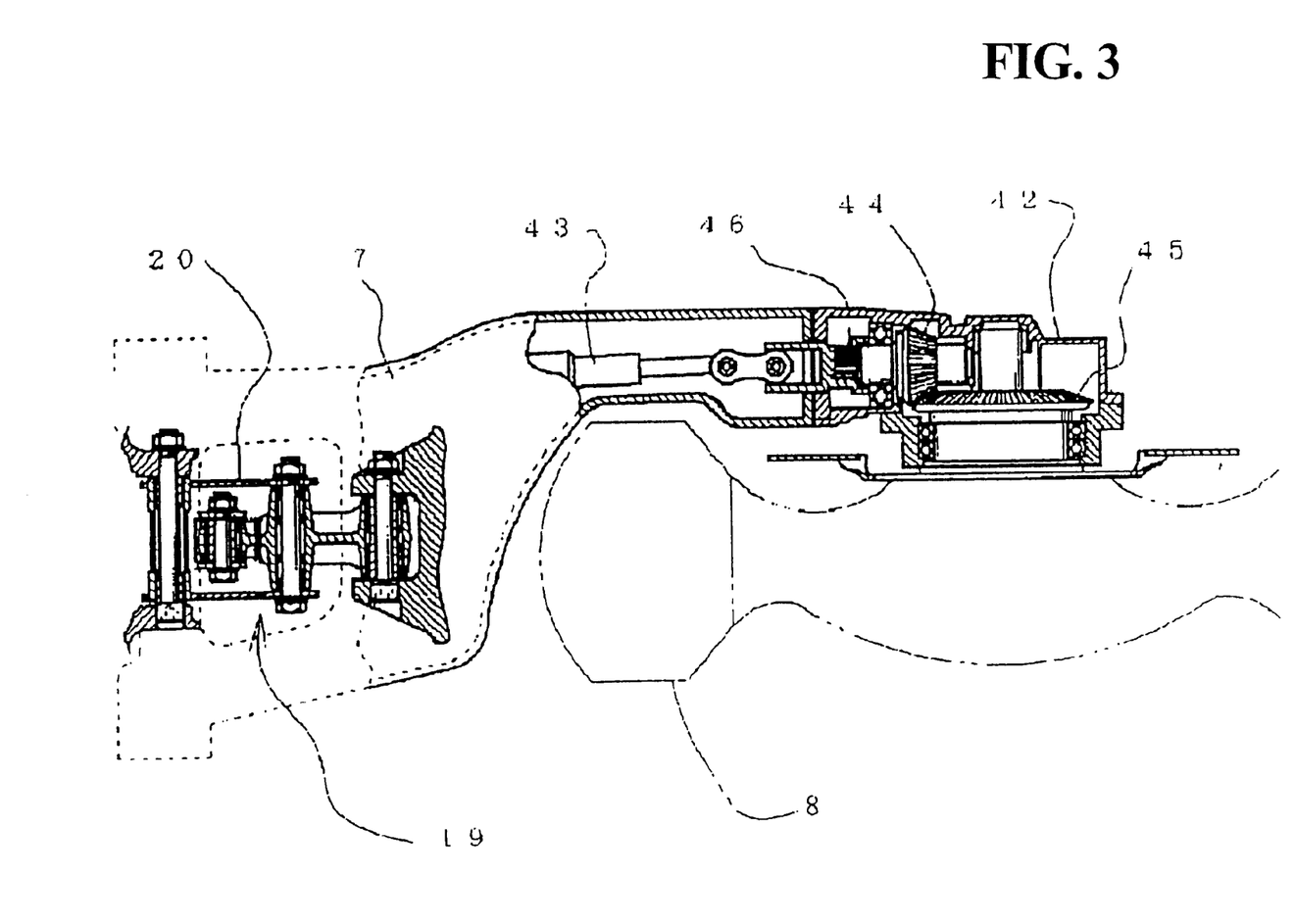
FIG. 3 is a partially-cutaway plan view of a swing arm according to the preferred embodiment.

As shown in FIGS. 2 and 3, a final gear case 42 is connected to the swinging end of the swing arm 7, and the rear wheel 8 is rotatably mounted on the final gear case 42. As best shown in FIG. 3, the swing arm 7 is a hollow member formed by aluminum die casting, and a drive shaft 43, connected to the engine 6, is inserted in the hollow swing arm 7.

A pair of bevel gears 44 and 45 includes axes perpendicular to each other and meshing with each other that are rotatably mounted in the final gear case 42. The bevel gear 44 is connected through a spline 46 to the rear end of the drive shaft 43.

Figure 4:
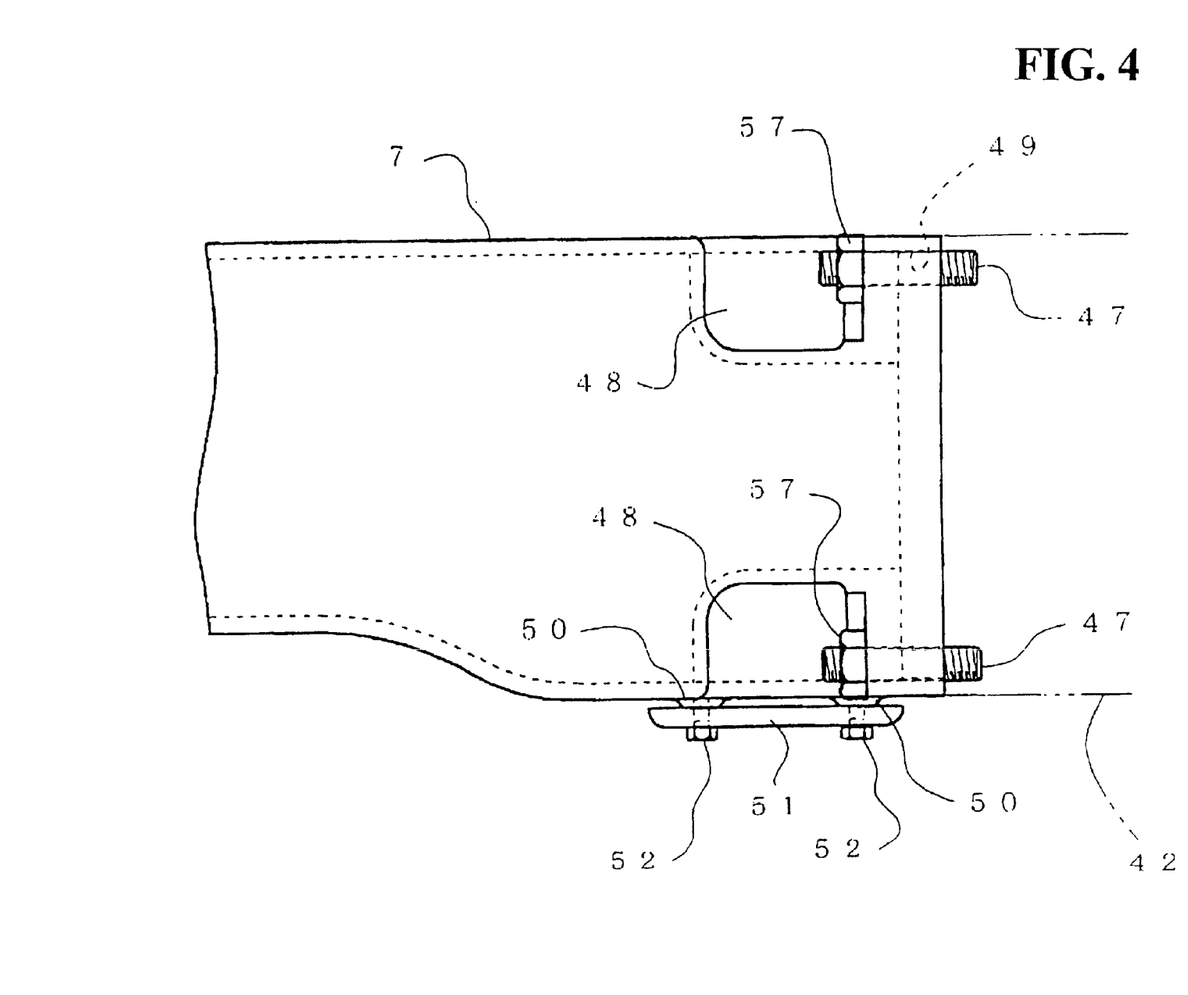
FIG. 4 is a side view of an essential part according to the preferred embodiment.

As shown in FIGS. 2 and 4, the swing arm 7 and the final gear case 42 are fastened together by means of a plurality of stud bolts 47 projecting from the final gear case 42 and a plurality of nuts 57 threadedly engaged with the stud bolts 47.

Figure 5:
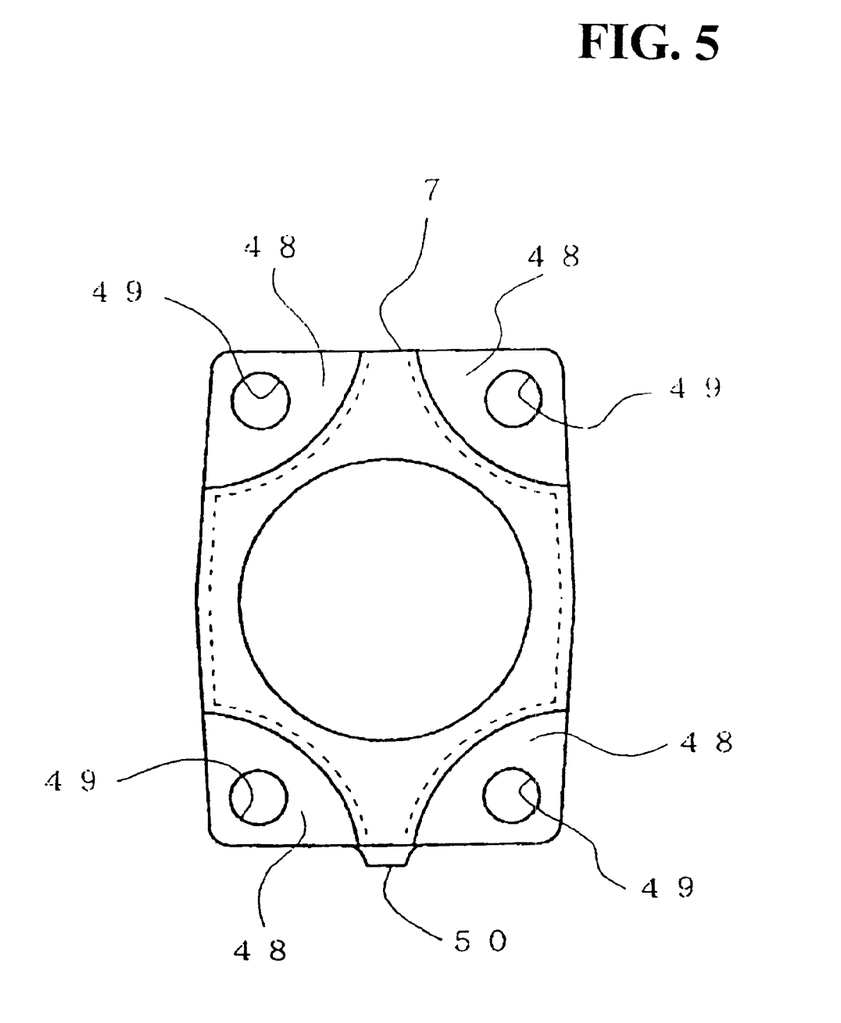
FIG. 5 is an end view of the swing arm according to the preferred embodiment.

This fastening structure will now be described in more detail. As shown in FIGS. 4 and 5, the swinging end of the swing arm 7 is formed with four recesses 48 spaced apart from each other in the circumferential direction of the swing arm 7 for respectively receiving the nuts 57, and the end surface of the swing arm 7 is formed with four through holes 49 respectively corresponding to the four recesses 48 for insertion of the stud bolts 47. The final gear case 42 is fastened to the swing arm 7 in the following manner. The stud bolts 47 of the final gear case 42 are inserted into the through holes 49 so that the front end portions of the stud bolts 47 project into the recesses 48, respectively. Then, the nuts 57 are temporarily engaged with the front end portions of the stud bolts 47 in the recesses 48. Then, a jig is inserted into each of the recesses 48 to rotate each nut 57 and for tightening the same.

As shown in FIG. 4, a pair of projections 50 are provided on the lower surface of the swinging end of the swing arm 7 so as to be spaced apart from each other in the longitudinal direction of the swing arm 7. Each projection 50 is formed with a tapped hole opening to the lower surface.

A reinforcing plate 51 as a characterizing member in the present invention is fixed to the projections 50 by means of bolts 52.

Figure 6A:
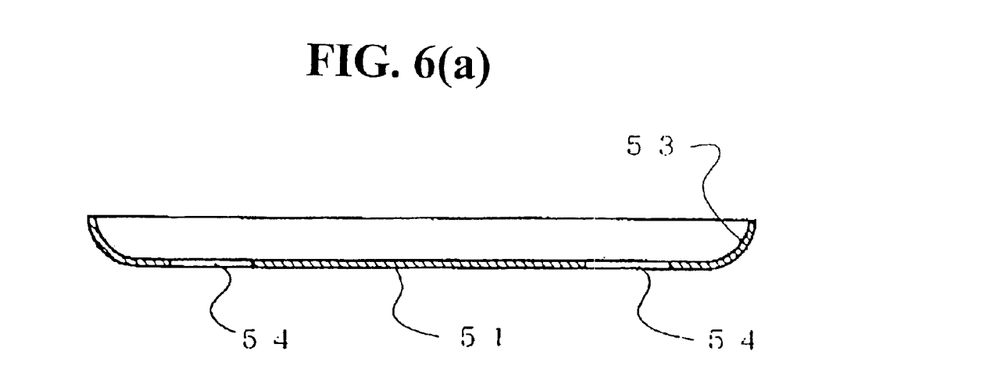
FIGS. 6a and 6b are a vertical sectional view and a plan view of a reinforcing plate according to the preferred embodiment, respectively.
Figure 6B:
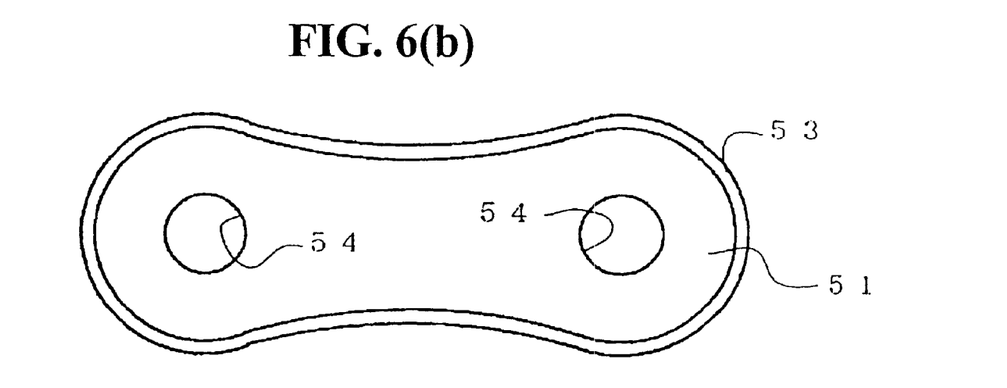

The reinforcing plate 51 is formed by pressing an iron plate. As shown in FIGS. 6a and 6b, the reinforcing plate 51 is substantially gourd-shaped as viewed in plan, and is formed with a rib 53 extending over the outer periphery.

A pair of bolt insertion holes 54 are formed in the vicinity of opposite end portions of the reinforcing plate 51 so as to be spaced apart from each other by the same distance as that between the two projections 50.

The reinforcing plate 51 is fixed to the lower side of the swing arm 7 by aligning the bolt insertion holes 54 of the reinforcing plate 51 with the tapped holes of the projections 50, next inserting the bolts 52 through the bolt insertion holes 54, and finally threadedly engaging the bolts 52 with the tapped holes of the projections 50.

At the fastened portion of the swing arm 7 to the final gear case 42 in the vehicle 1 according to this preferred embodiment, a compressive force acts on an upper portion of the swing arm 7 and a tensile force acts on a lower portion of the swing arm 7.

However, since the reinforcing plate 51 is mounted on the lower portion of the swing arm 7, the tensile force acting on the lower portion of the swing arm 7 can be sustained by the reinforcing plate 51.

As a result, the rigidity of the fastened portion of the swing arm 7 to the final gear case 42 can be ensured.

A force of sustaining the tensile force can be easily adjusted by suitably setting the shape or size of the reinforcing plate 51, for example. In association therewith, the rigidity balance at the fastened portion of the swing arm 7 to the final gear case 42 can also be easily adjusted.

Figure 7:
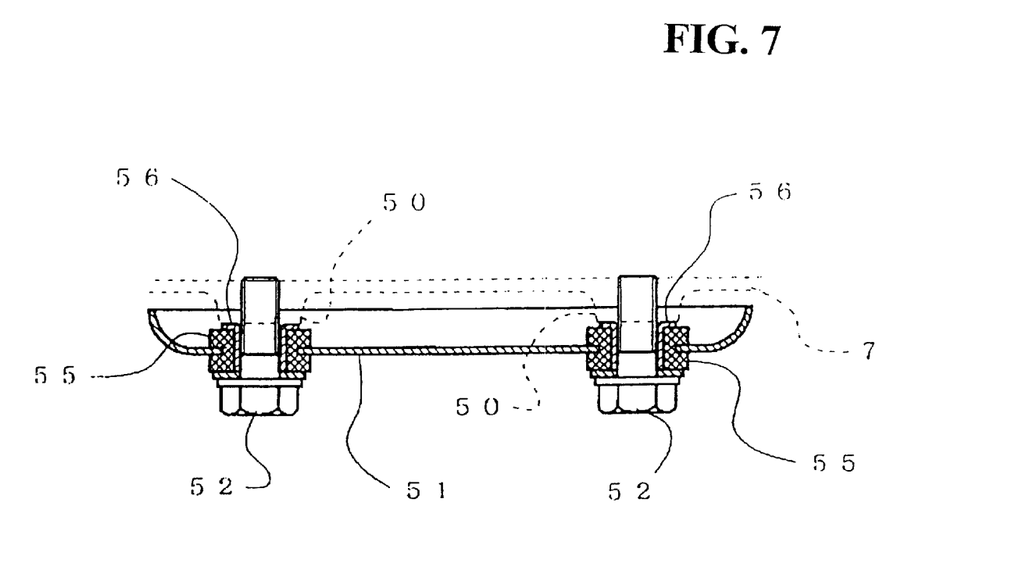
FIG. 7 is a vertical sectional view of an essential part according to another preferred embodiment of the present invention.

FIG. 7 shows another preferred embodiment of the present invention. In this preferred embodiment, a damper ring 55, formed of an elastic material, is fitted with each bolt insertion hole 54 of the reinforcing plate 51, and a metallic collar 56 is mounted in each damper ring 55. Then, the bolts 52 are inserted through the collars 56 to fix the reinforcing plate 51 to the swing arm 7.

With this arrangement, the adjustable range of a degree of improvement in the rigidity by the reinforcing plate 51 can be widened.

According to the swing arm 7 for the vehicle of each preferred embodiment mentioned above, the rigidity at the fastened portion of the swing arm 7 to the final gear case 42 can be adjusted by the reinforcing plate 51 mounted on this fastened portion, so that the rigidity balance between the swing arm 7 and another portion can be easily adjusted.

Furthermore, the above-mentioned functions can be obtained by a simple configuration such that the reinforcing plate 51 is simply mounted.

It should be noted that the shape, size, etc. of each component used in each preferred embodiment mentioned above are merely illustrative and various modifications may be made according to design changes required, for example.

For instance, while the reinforcing plate 51 is mounted on the lower portion of the swing arm 7 in each preferred embodiment, it may be mounted on an upper portion, side portion, or suitable combined portions of the swing arm 7.

According to the swing arm for the vehicle of the present invention as described above, the rigidity at the fastened portion of the swing arm 7 to the final gear case can be adjusted by the reinforcing plate mounted on this fastened portion, so that the rigidity balance between the swing arm and another portion can be easily adjusted.

Furthermore, the above-mentioned functions can be obtained by a simple configuration such that the reinforcing plate is simply mounted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm for a vehicle pivotably mounted on a body frame and having a swinging end fastened to a final gear case on which a rear wheel is mounted comprising:
    a reinforcing plate mounted in the vicinity of said swinging end of said swing arm and fastened to said swing arm at two positions spaced apart from each other in the longitudinal direction of said vehicle.

2. The swing arm for a vehicle according to claim 1, wherein said reinforcing plate is formed of iron.

3. The swing arm for a vehicle according to claim 2, wherein said reinforcing plate is mounted through an elastic member to said swing arm.

4. The swing arm for a vehicle according to claim 3, and further including a collar mounted adjacent to said elastic member for mounting said reinforcing plate to said swing arm.

5. The swing arm for a vehicle according to claim 1, wherein said reinforcing plate is mounted through an elastic member to said swing arm.

6. The swing arm for a vehicle according to claim 5, and further including a collar mounted adjacent to said elastic member for mounting said reinforcing plate to said swing arm.

7. The swing arm for a vehicle according to claim 1, wherein said reinforcing plate is substantially gourd-shaped as viewed in plan and includes a rib extending over the outer periphery thereof.

8. The swing arm for a vehicle according to claim 1, wherein said reinforcing plate includes two apertures for securing said reinforcing plate to said swing arm.

9. The swing arm for a vehicle according to claim 1, wherein a recess is provided adjacent to the swinging end of said swing arm for securing the final gear case thereto, said reinforcing plate extending across said recess for ensuring the rigidity of the swing arm.

10. The swing arm for a vehicle according to claim 1, and further including bolts extending from said swinging end of said swing arm for mounting said reinforcing plate relative thereto.

11. A swing arm for a vehicle pivotably mounted on a body frame comprising:
    a swing arm having a first end pivotably mounted relative to said body frame and a distal end extending therefrom;
    a final gear case secured to said distal end of said swing arm;
    a reinforcing plate mounted adjacent to said distal end of said swing arm and fastened to said swing arm at two positions spaced apart from each other in the longitudinal direction of said vehicle for ensuring the rigidity of the swing arm.

12. The swing arm for a vehicle according to claim 11, wherein said reinforcing plate is formed of iron.

13. The swing arm for a vehicle according to claim 12, wherein said reinforcing plate is mounted through an elastic member to said swing arm.

14. The swing arm for a vehicle according to claim 13, and further including a collar mounted adjacent to said elastic member for mounting said reinforcing plate to said swing arm.

15. The swing arm for a vehicle according to claim 11, wherein said reinforcing plate is mounted through an elastic member to said swing arm.

16. The swing arm for a vehicle according to claim 15, and further including a collar mounted adjacent to said elastic member for mounting said reinforcing plate to said swing arm.

17. The swing arm for a vehicle according to claim 11, wherein said reinforcing plate is substantially gourd-shaped as viewed in plan and includes a rib extending over the outer periphery thereof.

18. The swing arm for a vehicle according to claim 11, wherein said reinforcing plate includes two apertures said reinforcing plate to said swing arm.

19. The swing arm for a vehicle according to claim 11, wherein a recess is provided adjacent to the distal end of said swing arm for securing the final gear case thereto, said reinforcing plate extending across said recess for ensuring the rigidity of the swing arm.

20. The swing arm for a vehicle according to claim 11, and further including bolts extending from said distal end of said swing arm for mounting said reinforcing plate relative thereto.

* * * * *